United States Patent Office 3,711,477
Patented Jan. 16, 1973

3,711,477
5-AMINO-1,2,3-TRITHIANES
Hans-Peter Schelling, Oberwil, Basel-Land, Switzerland, and Fred Kuhnen, Weil, (Rhine), Germany, assignors to Sandoz Ltd. (also known as Sandoz AG), Basel, Switzerland
No Drawing. Filed Aug. 6, 1970, Ser. No. 61,839
Claims priority, application Switzerland, Aug. 15, 1969, 12,410/69
Int. Cl. C07d 87/46
U.S. Cl. 260—247.1
9 Claims

ABSTRACT OF THE DISCLOSURE

The invention concerns new 1,2,3-trithiane compounds of the formula:

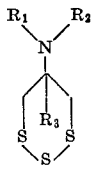

wherein $R_1$ and $R_2$ are each hydrogen, alkyl of 1 to 4 carbon atoms, allyl, phenyl, benzyl, cyclopentyl or cyclohexyl, or together with the nitrogen atom pyrrolidine, piperidine or morpholine, and
$R_3$ is hydrogen or alkyl of 1 to 4 carbon atoms, and acid addition salts thereof.

The compounds are useful as pesticides. More particularly the compounds possess insecticidal, acaricidal, nematocidal and fungicidal properties.

---

The invention relates to new 1,2,3-trithiane compounds.
The present invention provides compounds of Formula I,

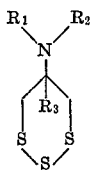    I wherein
$R_1$ and $R_2$ are each hydrogen, alkyl of 1 to 4 carbon atoms, allyl, phenyl, benzyl, cyclopentyl or cyclohexyl, or together with the nitrogen atom pyrrolidine, piperidine or morpholine, and
$R_3$ is hydrogen or alkyl of 1 to 4 carbon atoms, and acid addition salts thereof.
The present invention also provides a process for the production of a compound of Formula I comprising reacting a compound of Formula II,

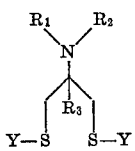    II wherein $R_1$, $R_2$ and $R_3$ are as defined above, and
Y is hydrogen or a leaving group replaceable by sulphide, with sulphur dichloride, when Y is hydrogen, or with an alkali metal sulphide when Y is a leaving group replaceable by sulphide.

In the case where Y is hydrogen, the reaction is preferably effected in a solvent which is inert under the reaction conditions e.g. benzene, toluene or chlorobenzene. The reaction is preferably carried out in an oxygen free atmosphere e.g. an atmosphere of nitrogen, and in the presence of a basic reagent, e.g. sodium ethylate in alcohol, sodium carbonate or potassium carbonate. The sulphur dichloride is conveniently added, preferably dropwise, at a temperature of between 0° and 50° C., and the reaction mixture is preferably maintained at a temperature of between about 18 and 22° C., conveniently with stirring, over a period of between 10 and 20 hours. Working up may be effected in conventional manner.

In the case where Y is a leaving group replaceable by sulphide, it is preferred that the alkali metal sulphide be sodium sulphide. The alkali metal sulphide may be in hydrated or anhydrous form. Preferably also, Y is a benzene-sulphonic, toluene-sulphonic, methane sulphonic or a sulphite group. The reaction may be carried out by the addition of the alkali metal sulphide in a suitable solvent, e.g. methanol to the compound of Formula II in a suitable solvent, e.g. methanol, preferably over an extended period with stirring to avoid undesirable heating up of the reaction mixture. The reaction mixture is preferably maintained at about room temperature for a period of about one hour. Working up may be effected in conventional manner.

The compounds of General Formula I are obtained in the form of oils or crystalline substances, which are generally soluble in organic solvents. They possess a characteristic UV-absorption maximum at 260–265 m$\mu$.

The acid addition salts of the compounds of General Formula I are obtained by reacting a corresponding acid with a compound of Formula I. They may, for example, be characterized by melting point.

The compounds of Formula II wherein Y is hydrogen, used as starting materials for the production of the compounds of Formula I, may be obtained by reductive debenzylation in known manner of compounds of General Formula III,

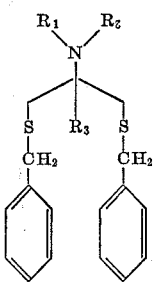    III wherein $R_1$, $R_2$ and $R_3$ are as defined above, e.g. with lithium in ammonia or sodium in butanol.
The compounds of General Formula II, wherein Y is a leaving group replaceable by sulphide, used as starting materials for the production of compounds of Formula I may, for example, be obtained by reacting a compound of General Formula IV,

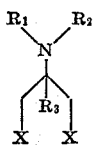

$$\begin{array}{c} R_1 \quad R_2 \\ \diagdown \!\! \diagup \\ N \\ | \\ R_3 \\ | \\ X \quad X \end{array} \qquad IV$$

wherein $R_1$, $R_2$, and $R_3$ are as defined above, and
X is halogen, preferably chlorine, with a compound of General Formula V, $$MeSY \qquad V$$

wherein

Y is as defined above, and
Me is a metal or ammonium cation, preferably alkali metal, especially sodium, in an appropriate solvent, e.g. ethanol.

The compounds of General Formulae III and IV are generally described in the literature. Insofar as they are not described they may be prepared by a process analogous to that described in respect of the production of the known compounds.

The compounds of General Formula I and the acid addition salts thereof, e.g. the acetates, benzoates, oxalates, hydrochlorides, hydrogen sulphates, are useful pesticides, as indicated by their insecticidal acaricidal, nematocidal and fungicidal properties. They are effective against eating and sucking insects, particularly against spider mites, and also possess fungicidal effects, e.g. they exhibit a systemic effect against pathogenic fungi.

While effective against insects, mites, nematodes and pathogenic fungi the compounds and their acid addition salts possess only a low level of toxicity in warm-blooded animals. The new compounds and their acid addition salts are therefore useful as active agents in pesticides for the treatment of inhabitated rooms, cellars, attics and stables, and for the protection of plants and animals in their different forms of development, against noxious organisms, e.g. noxious insects, mites, nematodes and fungi.

The combatting of noxious organisms may be carried out by conventional methods, e.g. by treating the subjects or locus to be protected with the active agent by spraying, sprinkling, befogging, fumigating, strewing, dusting or vapourizing. Pesticidal compositions incorporating the active agents of the invention may be employed in the form of dusting or spraying agents, e.g. as solutions or dispersions, prepared with water or suitable organic solvents, e.g. alcohol, petroleum or tar distillates and in combination with emulsifying agents, e.g. liquid polyglycol ethers derived from high molecular weight alcohols, mercaptans or alkyl phenols with an alkylene oxide. Suitable organic solvents such as ketones, aromatic, optionally halogenated hydrocarbons, or mineral oils, may also be added as solution aids.

The pesticidal compositions, such as spraying and dusting agents, may contain conventional inert carrier materials, e.g. talc, diatomaceous earth, bentonite, pumice, or other additives such as cellulose derivatives, as well as the usual wetting agents and adhesives to improve wettability and adhesiveness.

The active agents of the invention may be present in the pesticidal composition as mixtures with other known active agents. Formulations may generally contain between 2 and 90%, preferably between 5 and 50% by weight of active agent and application forms may generally contain between 0.02 and 90%, preferably between 0.1 and 20% by weight of active agent.

The active agent formulations may be produced in known manner, e.g.:

(a) 25 parts by weight of an active agent of the invention, 5 parts by weight of a condensation product from formaldehyde and naphthalene sulphonate, 2 parts by weight of dextrin, 1 part by weight of ammonium caseinate and 62 parts by weight of diatomaceous earth are mixed until a homogeneous mixture is obtained, and then this is subsequently ground until the particles are considerably smaller than 45 microns as an average. Before application the powder is diluted with water to the desired concentration.

(b) 25 parts by weight of an active agent of the invention are mixed with 25 parts by weight of an alkylphenol-ethylene oxide adduct (with approximately 10 moles of ethylene oxide) and 50 parts by weight of acetone. Before application the concentrate is diluted with water to the desired concentration.

The following application examples illustrate the effectiveness of the compounds of the invention, but in no way limti the scope thereof.

Insecticidal effect against *Bruchidius obtectus* (bean weevil)—contact effect

Petri dishes having a diameter of 7 cm. are sprayed by means of a spraying nozzle with 0.1 to 0.2 cc. of an emulsion containing 0.0125% of 5-dimethylamino-1,2,3-trithiane-oxalate according to the formulation (Example *a*). The emulsion is allowed to dry for about 4 hours and then 10 Bruchidus imagos are placed in each dish, which is covered with a lid of fine mesh brass wire grating. The animals are kept without food at room temperature. After 48 hours the rate of mortality is determined. The mortality rate is indicated as percentage. 100% means that all the bean weevils were killed, 0% means that no bean weevil was killed. Evaluation shows a mortality rate of 100%.

Insecticidal effect against *Ephestia kuehniella* (flour moth)—contact effect

Petri dishes having a diameter of 7 cm., each containing 10 kuehniella caterpillars having a length of 10 to 12 mm., are sprayed by means of a spraying nozzle with 0.1 to 0.2 cc. of an emulsion containing 0.05% of 5-dimethylamino-1,2,3-trithiane-oxalate. The dishes are then covered with a fine mesh brass wire grating. After drying the emulsion, a wafer is given as food and renewed as required. After five days the rate of mortality is determined as a percentage by counting out the live and dead animals. 100% means that all the caterpillars were killed, 0% means that no caterpillar was killed. Evaluation shows a mortality rate of 100%.

Insecticidal effect against *Aphis fabae* (black bean aphid)—contact effect

Broad bean plants (*Vicia faba*) are sprayed to run off with a spraying liquor containing 0.0125% of 5-dimethyl-amino-1,2,3-trithiane-oxalate. The broad bean plants are strongly infected with all the forms of development of the black bean aphid (*Aphis fabae*). After 2 days the rate of mortality is determined. The mortality rate is indicated as a percentage. 100% means that all the bean aphids were killed, 0% means that no bean aphid was killed. Evaluation shows a mortality rate of 100%.

Nematocidal effect against *Panagrellus redivivus* (paste nematode)

1 cc. of an aqueous suspension of *Panagrellus redivivus*, containing about 120 nematodes, is placed in a small cup having a diameter of 5.5 cm. and a height of 3.2 cm., and containing 7 g. of Terralite. 1 cc. of an emulsion containing 0.2% of 5-dimethylamino - 1,2,3 - trithiane-oxalate is then sprayed over the Terralite. After 48 hours the contents of the cup are examined in accordance with Baermann's extraction method (G. Baermann, Meded.

Geneesk. Lab. Weltevreden 1917, 41–47), and the live nematodes are counted out under a binocular magnifying glass. The rate of mortality is indicated as a range of 0 to 9 (9=maximum effect, no live nematodes, 0=no effect, over 100 live nematodes). Evaluation show a mortality rate of 9.

Fungicidal effect against *Uromyces phaseoli* (bean rust)—systemic effect

Potted bean plants (*Phaseolis vulgaris*) are watered in the 2-leaf stage with 70 cc. of a suspension containing 0.0125% of 5-dimethylamino-1,2,3-trithiane such that the green parts of the plants remain untouched. After 24 hours the plants are infected with spores of the bean rust (*Uromyces phaseoli*). Then they are kept for 2 days at 100% relative atmospheric humidity and subsequently for 10 days under normal laboratory conditions in artificial light, the infestation being then evaluated. For the evaluation of the results the following evaluation range is used:

1=no effect (0–5% effect)
3=weak effect (until 50% effect)
6=medium to good effect (50–95% effect)
9=very good effect (95–100% effect)

A result of 9 was obtained.

Fungicidal effect against *Uromyces phaseoli*—contact effect

Potted bean plants in the 2-leaf stage are sprayed twice on a turntable, by means of a spraying nozzle, with an application liquor containing 0.0125% of 5-dimethylamino-1,2,3-trithiane (approximately 0.7 cc. per plant). The plants are covered with a thin layer of the liquor which is allowed to dry off. After 24 hours the plants are sprayed with a suspension of Uromyces spores. Then they are kept for 2 days at 100% relative atmospheric humidity and subsequently for 10 days under normal laboratory conditions, infestation being then evaluated. Evaluation is effected in accordance with the range indicated in the preceding example. A result of 9 was obtained.

Germination test of *Alternaria circinans*

A slide of 19.5 cm.$^2$ area is sprayed twice on a turntable by means of a fixed spraying nozzle with an emulsion containing 0.2% of 5-dimethylamino-1,2,3-trithiane so as to deposit 0.03 to 0.14 cc. per slide. After drying the emulsion for 4 hours, 0.5 cc. of a suspension of spores (conidia) are placed on each slide by means of a pipette (density of about 200,000 spores per cc.). Incubation is allowed to take place at 23° over a period of 24 hours in a moisture chamber. Evaluation of the germination is then effected under the microscope and in accordance with the following range:

1=no effect (90–100% of the spores germinated)
3=weak effect (50–90% of the spores germinated)
6=medium to good effect (10–50% of the spores germinated)
9=very good effect (0–10% of the spores germinated)

A result of 9 was obtained.

Fungicidal effect against *Erysiphe graminis* (barley blight)

Barley plants (10 plants per pot) in the 1-leaf stage, the leaves having a length of 6 to 8 cm., are sprayed on a turntable to run off with a liquor containing 0.05% of 5-morpholino-1,2,3-trithiane-oxalate by means of a spraying nozzle. The plants are thus covered with a thin layer of the liquor and allowed to dry off. The plants are dusted with conidia of blight after about 4 hours. Subsequently the plants are kept for 7 days at 60–80% relative atmospheric humidity and in constant light conditions. Then the fungicidal effect is determined according to the following evaluation scheme:

1=no effect (0–5% effect)
3=weak effect (until 50% effect)
6=medium to good effect (50–95% effect)
9=very good effect 95–100% effect)

A result of 9 was obtained.

The following examples illustrate the production of the compounds, but in no way limit the scope of the invention. The temperatures are indicated in degrees centigrade.

EXAMPLE 1

5-dimethylamino-1,2,3-trithiane 14.1 g. of 1,3-bis(benzylthio)-2-dimethylamino propane (Formula III) are dissolved in 280 cc. of ether and 420 cc. of liquid ammonia. 4.3 g. of lithium are added in portions to this solution at −65° while stirring. After half an hour 43 cc. of ethanol are added dropwise to the dark blue solution, cooling is discontinued and the solvent is removed by evaporation in a stream of nitrogen.

The pulp-like residue is dissolved in 280 cc. of water and is extracted with ether in an atmosphere of nitrogen. The pH value of the aqueous phase is adjusted to 7.5 with 18% hydrochloric acid, the aqueous phase is saturated with sodium chloride and extracted with ether in an atmosphere of nitrogen. The ether extracts are dried with calcium chloride and concentrated by evaporation, whereby 1,3-dimercapto-2-dimethylamino propane (Formula II) is obtained as yellow oil. The hydrogen oxalate has a M.P. of 108°–114°.

4.1 g. of 1,3-dimercapto-2-dimethylamino propane are dissolved in 1500 cc. of anhydrous toluene in an atmosphere of nitrogen and a solution of 4.5 g. of sodium ethylate in 30 cc. of ethanol is added at 10°. After 15 minutes 3.4 g. of sulphur dichloride are added dropwise, whereby the temperature is maintained below 15°. The turbid solution is stirred at 18–22° for 20 hours and then extracted twice with 200 cc. amounts of a saturated sodium hydrogen carbonate solution, it is washed with a saturated sodium chloride solution, dried over anhydrous potassium carbonate and concentrated by evaporation. The residue is purified by chromatography on 300 g. of silica gel with benzene/methanol 95:5, whereby the 5-dimethylamino-1,2,3-trithiane is obtained in pure form as a pale yellow oil.

*Analysis.*—$C_5H_{11}NS_3$ (molecular weight: 181.3): Calculated (percent): C, 33.1; H, 6.0; N, 7.7; S, 53.0. Found (percent): C, 33.2; H, 6.2; N, 7.6; S, 52.9.

The hydrogen oxalate of the 5-dimethylamino-1,2,3-trithiane is obtained by adding dropwise an ether solution which is saturated with anhydrous oxalic acid, the hydrogen oxalate, having a M.P. of 119–121°.

*Analysis.*—$C_7H_{13}NO_4S_3$ (molecular weight: 271.4): Calculated (percent): C, 31.0; H, 4.8; N, 5.2; S, 35.4. Found (percent): C, 30.7; H, 5.0; N, 4.7; S, 34.8.

EXAMPLE 2

5-dimethylamino-5-methyl-1,2,3-trithiane

A solution of 24.5 g. (0.1 mol) of sodium sulphide-nonahydrate in 600 cc. of methanol is added dropwise during 45 minutes to 44.5 g. (0.1 mol) of 1,3-bis-(benzene sulphonylthio)-2-dimethylamino-2-methyl propane in 1000 cc. of methyl alcohol. The mixture is stirred at room temperature for 1 hour, the methanol is removed at low temperature at a water pump vacuum and the residue is divided between ether and water. The ether phase is separated, washed twice with water and dried over sodium sulphate. After removing the ether a yellow oil is obtained. By chromatography on silica gel with ether, pure 5-dimethylamino-5-methyl-1,2,3-trithiane is obtained.

*Analysis.*—$C_6H_{13}NS_3$ (molecular weight: 195.3): Calculated (percent): C, 36.9; H, 6.6; N, 7.1; S, 49.2. Found (percent): C, 37.2; H, 6.7; N, 7.1; S, 48.9.

The hydrogen oxalate of the 5-dimethylamino-5-methyl-1,2,3-trithiane is obtained by adding downwise an ether solution which is saturated with anhydrous oxalic acid to 5-dimethylamino-5-methyl-1,2,3-trithiane, the hydrogen oxalate having a M.P. of 114–116°.

*Analysis.*—$C_8H_{15}NO_4S$ (molecular weight: 285.4): Calculated (percent): C, 33.7; H, 5.3; N, 4.9; S, 33.7. Found (percent): C, 33.4; H, 5.2; N, 4.2; S, 33.1.

In an analogous manner to that described in Example 2 the following compounds of General Formula I are obtained:

EXAMPLE 3

5-piperidino-1,2,3-trithiane

*Analysis.*—$C_8H_{15}NS_3$ (molecular weight: 221.4): Calculated (percent): C, 43.4; H, 6.8; N, 6.3; S, 43.4. Found (percent): C, 43.6; H, 6.8; N, 6.2; S, 43.6. M.P.: 52–54°.

Hydrogen oxalate of the 5-piperidino-1,2,3-trithiane

*Analysis.*—$C_{10}H_{17}NO_4S_3$: Molecular weight: 311.4; M.P.: 160–170°.

EXAMPLE 4

5-morpholino-1,2,3-trithiane

*Analysis.*—$C_7H_{13}NOS_3$ (M.P.: 94–96°; molecular weight: 223.3): Calculated (percent): C, 37.6; H, 5.9; N, 6.3; S, 43.1. Found (percent): C, 38.0; H, 6.2; N, 6.3; S, 43.4.

Hydrogen oxalate of the 5-morpholino-1,2,3-trithiane

*Analysis.*—$C_9H_{15}NO_5S_3$: Molecular weight: 313.3; M.P.: 165–166°.

The starting materials of General Formula II employed in Examples 3, 4 and 2 respectively are produced in accordance with the following examples.

1,3-bis(benzene sulphonylthio)-2-piperidino-propane

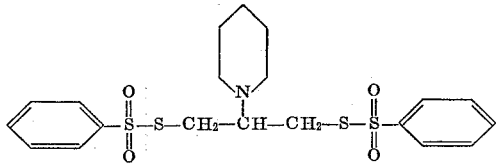

116 g. (0.5 mol) of 2-piperidino-1,3-dichloropropane-hydrochloride are dissolved in 800 cc. of alcohol and a solution of 11.5 g. (0.5 mol) of sodium in 400 cc. of alcohol are added. After the addition of 200 g. (1 mol) of sodium benzenethiosulphonate the mixture is stirred at 50° for 4 hours. The precipitated sodium chloride is filtered off and the filtrate is concentrated by evaporation in a vacuum. The residue is dissolved in methanol and is crystallized. M.P. 104–106°.

*Analysis.*—$C_{19}H_{23}NO_5S_4$ (molecular weight: 473.6): Calculated (percent): C, 50.9; H, 5.3; N, 3.0; S, 27.2. Found (percent): C, 50.7; H, 5.4; N, 3.0; S, 27.0.

In an analogous manner the following compounds of Formula II are produced.

1,3-bis(benzene sulphonylthio)-2-morpholino-propane

*Analysis.*—$C_{19}H_{23}NO_5]S_4$ (molecular weight: 473.6): Calculated (percent): C, 48.2; H, 4.8; N, 2.9; S, 27.1. Found (percent): C, 48.0; H, 4.9; N, 2.9; S, 27.3. M.P.: 109–110°.

1,3-bis(benzene sulphonylthio)-2-dimethylamino-2-methyl-propane

*Analysis.*—$C_{18}H_{23}NO_4S_4$ (molecular weight: 445.6): Calculated (percent): C, 48.5; H, 5.2; N, 3.1; S, 28.7. Found (percent): C, 48.0; H, 5.3; N, 2.9; S, 28.5. M.P.: 75–76°.

The following compounds are produced in a manner analogous to that described in Examples 1 and 2 viz.

5-pyrrolidine-1,2,3-trithiane
5-ethylamino-5-n-butyl-1,2,3-trithiane
5-allylamino-1,2,3-trithiane
5-(N-methyl-N-phenylamino)-1,2,3-trithiane
5-benzylamino-5-ethyl-1,2,3-trithiane
5-(N-ethyl-N-cyclopentylamino)-1,2,3-trithiane, and
5-cyclohexylamino-5-n-propyl-1,2,3-trithiane.

These compounds are characterized by quantitative analysis and also by U.V. spectroscopy wherein they show a characteristic UV-absorption maximum between 260 and 265 mμ.

What is claimed is:
1. A compound of the formula:

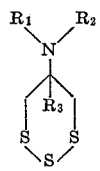

wherein
$R_1$ and $R_2$ are each hydrogen, alkyl of 1 to 4 carbon atoms, allyl, phenyl, benzyl, cyclopentyl or cyclohexyl, or together with the nitrogen atom pyrrolidine, piperidine or morpholine, and
$R_3$ is hydrogen or alkyl of 1 to 4 carbon atoms, or an acid addition salt therof.

2. The compound of claim 1 which is 5-dimethylamino-1,2,3-trithiane.

3. The compound of claim 2 in the form of the hydrogen oxalate thereof.

4. The compound of claim 1 which is 5-dimethylamino-5-methyl-1,2,3-trithiane.

5. The compound of claim 4 in the form of the hydrogen oxalate thereof.

6. The compound of claim 1 which is 5-piperidino-1,2,3-trithiane.

7. The compound of claim 6 in the form of the hydrogen oxalate thereof.

8. The compound of claim 1 which is 5-morpholino-1,2,3-trithiane.

9. The compound of claim 8 in the form of the hydrogen oxalate thereof.

References Cited

UNITED STATES PATENTS 3,318,936   5/1967   Sakai et al. _____ 260—454
3,444,186   5/1969   Sakai et al. _____ 260—327

ALEX MAZEL, Primary Examiner

J. TOVAR, Assistant Examiner

U.S. Cl. X.R.
260—293.68, 326.82, 327; 424—248